(12) United States Patent
Foerstner et al.

(10) Patent No.: US 11,192,233 B2
(45) Date of Patent: Dec. 7, 2021

(54) ARRANGEMENT OF HOUSING AND GUIDE TUBE AND HANDHELD WORK APPARATUS HAVING SAID ARRANGEMENT

(71) Applicant: Andreas Stihl AG & Co. KG, Waiblingen (DE)

(72) Inventors: Dirk Foerstner, Stuttgart (DE); Martin Failenschmid, Stuttgart (DE); Konrad Frencel, Benningen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 471 days.

(21) Appl. No.: 15/659,470

(22) Filed: Jul. 25, 2017

(65) Prior Publication Data
US 2018/0021934 A1 Jan. 25, 2018

(30) Foreign Application Priority Data

Jul. 25, 2016 (EP) ..................... 16400032

(51) Int. Cl.
*B25G 1/04* (2006.01)
*A01D 34/81* (2006.01)
(Continued)

(52) U.S. Cl.
CPC .............. *B25F 5/028* (2013.01); *A01D 34/81* (2013.01); *A01D 34/82* (2013.01); *A01D 34/90* (2013.01);
(Continued)

(58) Field of Classification Search
CPC . B25F 5/026; B25F 5/028; B25G 1/04; A01D 34/68; A01D 34/81; A01D 34/82;
(Continued)

(56) References Cited

U.S. PATENT DOCUMENTS

| 4,047,821 A | * | 9/1977 | Hoke et al. ............. B25G 1/04 24/265 B |
| 5,662,428 A | | 9/1997 | Wilson |

(Continued)

FOREIGN PATENT DOCUMENTS

| CA | 2227656 A1 | 1/1999 |
| CA | 2313981 A1 | 1/2001 |

(Continued)

OTHER PUBLICATIONS

Partial English translation and first Office action of the Chinese Patent Office dated Jun. 16, 2021 in corresponding Chinese patent application 201710612823.3.

*Primary Examiner* — Clark F Dexter
(74) *Attorney, Agent, or Firm* — Walter Ottesen, P.A.

(57) ABSTRACT

An arrangement of a housing and a guide tube is provided wherein one end of the guide tube is held in the housing. The position of the guide tube is adjustable relative to the housing in the direction of the longitudinal center axis of the guide tube. A rotation stop stops swiveling of the guide tube relative to the housing and includes a guide part. The guide part is mounted in one of the guide tube and housing. A longitudinal wall runs in the direction of the axis on the other one of the guide tube and housing. The longitudinal wall interacts with the guide part during swiveling of the guide tube about its axis. The guide part is tiltable relative to the guide tube about a tilt axis. The tilt axis runs along the guide tube and at a distance (a, b) from the axis of the guide tube.

14 Claims, 7 Drawing Sheets

(51) Int. Cl.
*A01D 34/82* (2006.01)
*A01D 34/90* (2006.01)
*B25F 5/02* (2006.01)
*B65B 51/30* (2006.01)
*A01D 34/68* (2006.01)

(52) U.S. Cl.
CPC ............... *B25F 5/026* (2013.01); *B25G 1/04* (2013.01); *B65B 51/306* (2013.01); *A01D 34/68* (2013.01); *A01D 2034/907* (2013.01)

(58) Field of Classification Search
CPC ........................ A01D 34/90; A01D 2034/907; B65B 51/306; Y10T 403/32467; Y10T 403/7077
USPC ............................... 403/109.1, 377; 30/296.1
See application file for complete search history.

(56) References Cited

U.S. PATENT DOCUMENTS

| | | |
|---|---|---|
| 5,933,966 A | 8/1999 | Yates et al. |
| 8,793,831 B2 | 8/2014 | Katou et al. |
| 9,175,988 B2 | 11/2015 | Kieliger et al. |
| 9,333,636 B2 | 5/2016 | Yamada et al. |
| 2003/0001387 A1 | 1/2003 | Tawara et al. |
| 2008/0236124 A1 | 10/2008 | Heinzelmann |
| 2013/0000064 A1 | 1/2013 | Katou et al. |
| 2013/0081231 A1 | 4/2013 | Huang |

FOREIGN PATENT DOCUMENTS

| | | | | |
|---|---|---|---|---|
| CN | 101273685 A | 10/2008 | | |
| CN | 102933069 A | 2/2013 | | |
| CN | 104641207 A | 5/2015 | | |
| DE | 196 18 025 A1 | * 11/1997 | ............... | A01G 3/08 |
| DE | 20 2012 104 609 U1 | * 4/2013 | ............... | B25G 1/04 |
| EP | 1 974 597 A1 | 10/2008 | | |
| WO | 2011/155339 A1 | 12/2011 | | |

* cited by examiner

ARRANGEMENT OF HOUSING AND GUIDE TUBE AND HANDHELD WORK APPARATUS HAVING SAID ARRANGEMENT

CROSS REFERENCE TO RELATED APPLICATION

This application claims priority of European patent application no. 16400032.5, filed Jul. 25, 2016, the entire content of which is incorporated herein by reference.

FIELD OF THE INVENTION

The invention relates to an arrangement of a housing and a guide tube and to a handheld work apparatus with an arrangement of a housing and a guide tube.

BACKGROUND OF THE INVENTION

U.S. Pat. No. 5,933,966 discloses a handheld brushcutter which has a telescopic guide tube. For this purpose, the guide tube is held in the handle housing in a length-adjustable manner. In order to secure the rotational position during the adjustment, a boss is provided which is held on the guide tube and projects into a longitudinal groove of the housing.

The housing of work apparatuses of this type is customarily constructed from two housing shells which are connected to each other, for example are screwed to each other, at a plurality of connecting interfaces. The two housing shells may move away from each other under loading. If the housing shells are composed of plastic, deformation of the housing shells is also possible. It has been demonstrated that, under the action of appropriately large torques, the boss on the guide tube may be pushed out of the longitudinal groove and the stop is thereby ineffective. In addition, the longitudinal walls of the longitudinal groove may become damaged, and therefore secure guidance is no longer ensured.

SUMMARY OF THE INVENTION

It is an object of the invention to provide an arrangement of a housing and a guide tube, the rotation stop of which can also absorb large forces without being damaged in the process.

This object is achieved by an arrangement of a housing and a guide tube, wherein one end of the guide tube is held in the housing, wherein the position of the guide tube can be adjusted in relation to the housing in the direction of a longitudinal center axis of the guide tube, wherein at least one rotation stop against swiveling of the guide tube in relation to the housing is provided, wherein the rotation stop comprises a guide part, wherein the guide part is mounted in one of the components of the guide tube and housing and a longitudinal wall running in the direction of the longitudinal center axis of the guide tube is arranged on the other component, the longitudinal wall interacting with the guide part when the guide tube swivels about its longitudinal center axis, wherein the guide part is tiltable about at least one tilt axis in relation to the guide tube, wherein the tilt axis runs along the guide tube and at a distance from the longitudinal center axis of the guide tube. With regard to the handheld work apparatus, the object is achieved by a handheld work apparatus with an arrangement of a housing and a guide tube, wherein one end of the guide tube is held in the housing, wherein the position of the guide tube can be adjusted in relation to the housing in the direction of a longitudinal center axis of the guide tube, wherein at least one rotation stop against swiveling of the guide tube in relation to the housing is provided, wherein the rotation stop comprises a guide part, wherein the guide part is mounted in one of the components of the guide tube and housing and a longitudinal wall running in the direction of the longitudinal center axis of the guide tube is arranged on the other component, the longitudinal wall interacting with the guide part when the guide tube swivels about its longitudinal center axis, wherein the guide part is tiltable about at least one tilt axis in relation to the guide tube, wherein the tilt axis runs along the guide tube and at a distance from the longitudinal center axis of the guide tube, wherein a tool head is arranged at a first end of the guide tube, and wherein the housing is arranged at the second end of the guide tube.

It is provided that the rotation stop is formed between a longitudinal wall and a guide part. The guide part here is not rigidly fixed as in the prior art, for example to the guide tube, but rather can tilt in relation to the guide tube. The tilt axis runs here along the guide tube and at a distance from the longitudinal center axis of the guide tube. The orientation of the tilt axis along the guide tube means that the tilt axis is oriented parallel to the longitudinal center axis of the guide tube or encloses an angle of at most 10° with the longitudinal center axis of the guide tube, in a side view of the guide tube. The tilt axis is therefore oriented approximately in the direction of the longitudinal center axis of the guide tube. The tilting of the guide part has the effect that the height of the guide part is increased. Even if the radial distance between the components of the rotation stop, for example between the longitudinal wall and the guide tube, has increased due to deformation of the housing, and the radial overlap between the components of the rotation stop has reduced, it can be ensured in a simple manner via the height of the guide part, which height is increased because of the tilting, that the guide part cannot be pushed past the longitudinal wall. A self-reinforcing rotation stop is thereby provided in a simple manner since the radial overlap increases because of the increasing height of the guide part during tilting. The greater the force which is exerted on the rotation stop in the circumferential direction, the further the guide part tilts and the greater the height of the guide part and the overlap become, as a result of which swiveling of the guide tube in relation to the housing is reliably avoided. Further components can be arranged in the housing. However, the housing can also be configured as a tube in which the guide tube is held. The housing and the guide tube then form a telescopic tube. Any other configuration of the housing may also be advantageous.

The tilt angle about which the guide part can be tilted about the tilt axis from a rest position is advantageously at least 1°. A tilt angle of at least 5°, preferably at least 10°, has proven particularly advantageous. Via a sufficiently large tilt angle, a comparatively large increase in the height of that section of the guide part which protrudes out of the receptacle and therefore a large overlap with the longitudinal wall can be achieved. The tilt axis advantageously runs outside the guide tube. The tilt axis advantageously runs here on a surface, namely on the inner wall or on the outer wall of the guide tube. If the guide part is mounted in the guide tube, the tilt axis advantageously runs on the outer wall of the guide tube. If the guide part is mounted in the housing, the tilt axis advantageously runs on the inner wall of the guide tube. The distance of the tilt axis from the longitudinal center axis of the guide tube is advantageously at least the same size as the inner radius of the guide tube.

The tilt axis advantageously runs on an outer edge of the guide part, the outer edge running in the longitudinal direction. The guide part rests here in particular linearly with its outer edge on the inner wall or the outer wall of the guide tube.

The guide part is advantageously held in a receptacle. In a particularly preferred configuration, the receptacle is formed in the guide tube. However, it can also be provided that the receptacle is formed in the housing and the at least one longitudinal wall runs on the guide tube. The guide part has a foot which is at least partially arranged in the receptacle. The foot is advantageously the section which protrudes into the component in which the receptacle is formed. The foot is preferably that section of the guide part which protrudes into the guide tube. A head of the guide part protrudes out of the receptacle and interacts with the longitudinal wall. The longitudinal wall is preferably a longitudinal wall of a groove, and the head of the guide part at least partially protrudes into the groove. In the radial direction, the head of the guide part and the longitudinal wall have an overlap. The overlap refers to the distance, as measured in the radial direction, between the top side of the head and the front end of the longitudinal wall. If the longitudinal wall is arranged on the housing, the front end of the longitudinal wall is the radially inner side. If the longitudinal wall is arranged on the guide tube, the front end is the radially outer side. The overlap refers to the overlapping of longitudinal wall and head in the radial direction.

In an unloaded state, that is, if force is not exerted on the guide part, the head of the guide part has a width measured perpendicularly to the longitudinal center axis and perpendicularly to the radial direction of the guide tube and a height measured radially with respect to the guide tube. The width of the head is measured approximately in the circumferential direction, namely tangentially with respect to the circumferential direction. The width of the head is greater here than the height. This results in a very significant increase in the height during tilting of the head of the guide part, even at small tilt angles.

The width of the head is advantageously larger than the receptacle width measured in the same direction. Owing to the increased width of the head, it is prevented in a simple manner that the head will slide into the receptacle or through the receptacle. At least one section of the head protruding laterally over the receptacle advantageously forms the support section on which the tilt axis runs.

In an advantageous configuration, the head of the guide part has a length which is measured in the direction of the longitudinal center axis and is greater than the receptacle length measured in the same direction. The increased length of the head of the guide part in a simple manner prevents the head of the guide part from being able to slide into the receptacle. The head of the guide part advantageously completely covers the receptacle.

The foot of the guide part has a width which is measured perpendicularly to the radial direction and perpendicularly to the longitudinal center axis of the guide tube. The width of the foot of the guide part is measured tangentially with respect to the circumferential direction. The width of the foot of the guide part is preferably smaller than the width of the receptacle. Alternatively or additionally, in an advantageous configuration, the foot length measured in the direction of the longitudinal center axis is smaller than the receptacle length measured in the same direction. If both dimensions, that is, length and width, are smaller than the associated dimension of the receptacle, the foot can be plugged particularly simply through the receptacle. If only one of the dimensions out of length and width is smaller than the associated dimension of the receptacle, the foot can advantageously be plugged into the receptacle by tilting. The guide part is secured in the receptacle preferably via the groove base of the guide groove, which the head of the guide part faces. A separate securing of the foot of the guide part in the receptacle, for example via a snap connection or by pressing of the foot into the receptacle can thereby be omitted. For installation purposes, it may be advantageous to configure the foot of the guide part to be somewhat larger in one direction than the receptacle, for example by molding at least one web onto a side of the guide part which does not have a guide surface. As a result, the guide part, after being pushed into the receptacle, is held in the receptacle until the guide tube is mounted in the housing. If the guide tube is swiveled in relation to the housing during operation, the at least one web can be deformed or sheared off, and therefore the guide part lies loosely in the receptacle during customary operation and can tilt in relation to the guide tube even in the event of small acting forces.

The foot advantageously has at least one guide section which moves out of the receptacle when the guide part tilts about the tilt axis. In order even in the tilted state to achieve a defined position of the guide part in the receptacle, it is provided that the guide section extends in the form of a cylindrical section about the associated tilt axis. The associated tilt axis is the tilt axis about which the guide part tilts when the guide section moves out of the receptacle. In a section perpendicular to the longitudinal center axis of the guide tube, the guide section describes an arc with a constant radius about the associated tilt axis. As a result, the distance of the guide section from the longitudinal edge of the receptacle does not change during the tilting, and a constant distance between the guide section and the receptacle is produced during the tilting. The distance of the guide section from the tilt axis is advantageously only slightly larger than the distance of the longitudinal edge, which runs adjacent to the guide section, of the receptacle from the tilt axis, and therefore, in each tilt position, the foot is held and guided in the receptacle with little play. During the tilting, the guide section advantageously moves transversely with respect to the longitudinal direction of the guide tube along the longitudinal edge of the receptacle. The receptacle advantageously has a cross section which has at least one rectilinear section. The rectilinear section is preferably arranged adjacent to a guide section. The receptacle particularly advantageously has a rectangular cross section here.

In order to avoid excessive tilting and associated deformation and damage to the housing, a stop which defines the maximum tilt angle is advantageously provided. The maximum tilt angle, that is, the angle at which the stop is reached, is advantageously at least 10°, in particular at least 15°, preferably at least 20°. The maximum tilt angle is advantageously determined by a stop formed between the part bearing the receptacle, that is, guide tube or housing, and the guide part. The foot preferably has a stop section which, together with the part bearing the receptacle, in particular together with the guide tube, forms the stop. The stop section is advantageously arranged in each position of the guide part within the part bearing the receptacle. The stop section is preferably curved convexly or concavely, wherein the radius of curvature of the stop section corresponds in particular to the inner radius of the part bearing the receptacle. By means of the convex or concave curvature of the stop section, the stop section is placed against the inner side of the part bearing the receptacle. Flat contact of the stop section against the inner side of the part bearing the receptacle is thereby ensured. "On the inside" refers here to the location at which the foot is located and "on the outside" refers to the location at which the head is located. If the receptacle is formed in the guide tube, "on the inside" refers to the radially inner region.

In an advantageous configuration, the receptacle has a rectangular cross section. The cross section of the foot is advantageously likewise rectangular and matched to the cross section of the receptacle. The cross section of the foot is advantageously somewhat smaller here than the cross section of the receptacle. The guide part is advantageously arranged in the receptacle with little play. The receptacle is advantageously formed on the guide tube. The guide part is advantageously held in a positionally fixed manner in the direction of the longitudinal center axis of the guide tube on the part bearing the receptacle. The guide part can be arranged here in the receptacle with little play, but, during displacement of the part bearing the receptacle in relation to the part bearing the longitudinal wall, moves together with the part bearing the receptacle. The guide part together with the housing or with the guide tube preferably forms a stop for the maximally extended length of the guide tube.

The head advantageously has at least one even flat flank which interacts with the longitudinal edge when the guide tube swivels about its longitudinal center axis. The flank extends in the longitudinal direction of the guide tube and advantageously parallel to the radially oriented center line of the guide part. In an advantageous configuration, the flank extends in the longitudinal direction of the guide tube and at an angle to the radially oriented center line of the guide part. The flank is inclined in relation to a center plane containing the longitudinal center axis of the guide tube and the center line of the guide part. The angle of inclination is advantageously selected here in such a manner that the width of the head on the bottom side of the head facing the foot is smaller than on the top side facing the head. As a result, during the tilting, the flank of the head initially comes into contact with that region of the longitudinal wall which is remote from the foot. The longitudinal wall is advantageously connected to the region of the flank that faces away from the foot of the guide part. As a result of the fact that the distance of the contact region of flank and longitudinal wall from the connecting region of the longitudinal wall to the housing is small, the torque exerted on the connecting region is also small, and therefore the mechanical loading of the housing in the connecting region of the longitudinal wall is small.

The arrangement of housing and guide tube is particularly preferably provided for a handheld work apparatus, such as, for example, a lawn trimmer. For a handheld work apparatus with an arrangement of a housing and a guide tube, it is provided that a tool head is arranged at a first end of the guide tube and the housing is arranged at the second end of the guide tube. The housing preferably forms at least one handle of the work apparatus. In addition, an energy accumulator, for example a battery, can be arranged in the housing.

However, the arrangement of housing and guide tube can also be provided for other intended purposes, for example for telescopic tubes. The housing here can also be of tubular configuration.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
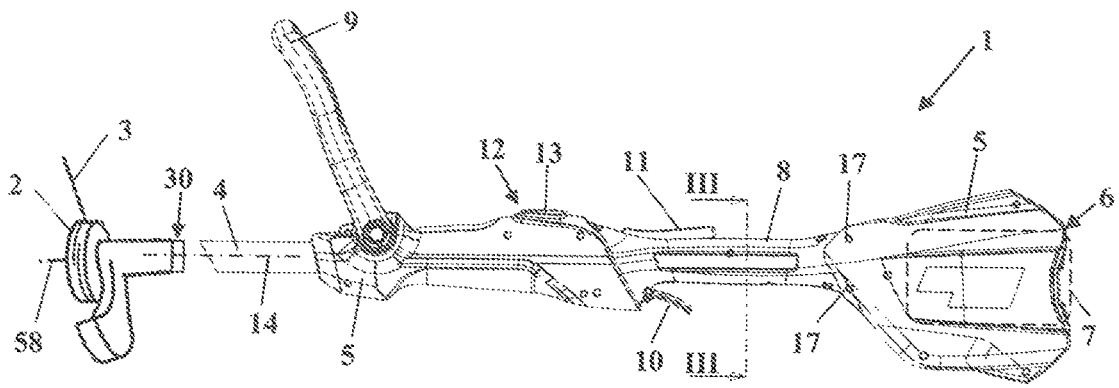
FIG. 1 shows a schematic side view of a handheld work apparatus.

FIG. 1 shows a lawn trimmer 1 as an embodiment of a handheld work apparatus. The lawn trimmer 1 has a tool head 2 on which a cutting filament 3 is held. The tool head 2 is arranged at a first end 30 of a guide tube 4. During operation, the tool head 2 rotates about a rotational axis 58. A second end 31 (not shown in FIG. 1) of the guide tube 4 (FIG. 4) protrudes into a housing 5 of the lawn trimmer 1. A receptacle 6 for a battery 7 is formed on the housing 5. The receptacle 6 and the battery 7 are illustrated schematically in FIG. 1. If the lawn trimmer 1 is not battery-operated, but rather connected by a cord, a cord for connection to an energy supply can be secured on the housing 5. An internal combustion engine can also be provided for driving the lawn trimmer 1. A handle 8 is formed on the housing 5, the handle, in the embodiment, surrounding the guide tube 4, as FIG. 1 shows. In addition, a bale handle 9 is mounted pivotably on the housing 5. Operator-controlled levers 10 and 11 which serve for operating a drive motor (not shown) for the tool head 2 are arranged on the handle 8. The drive motor is preferably arranged in the tool head 2 at the first end 30 of the guide tube 4.

The longitudinal center axis 14 of the guide tube 4 runs rectilinearly in the section arranged in the housing 5. The guide tube 4 can also run in a curved manner outside the housing 5, and therefore the longitudinal center axis 14 can also have a curved profile. The directional details regarding the longitudinal center axis 14 refer here to that section of the guide tube 4 which is arranged in the housing 5 and runs rectilinearly.

Figure 2:
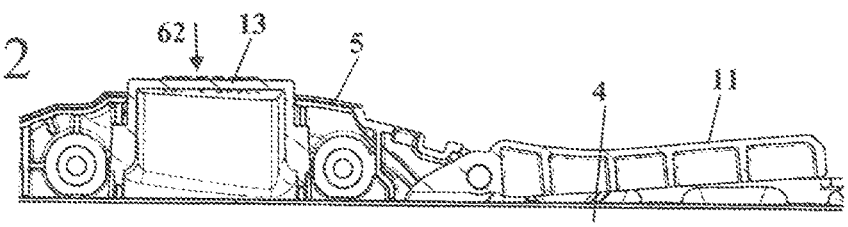
FIG. 2 shows a partial longitudinal section through the work apparatus in the region of the length adjustment unit.
Figure 2:
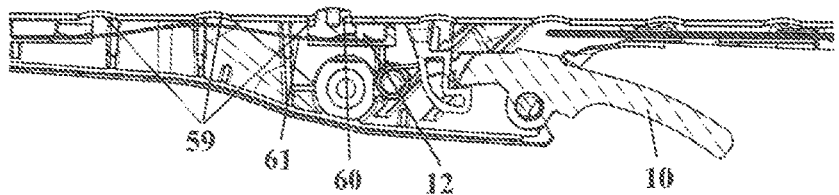

The position of the guide tube 4 in relation to the housing 5 is adjustable in the direction of the longitudinal center axis 14 of the guide tube 4, and therefore the length of the guide tube 4 protruding out of the housing 5 can be adjusted. For this purpose, a length adjustment unit 12 is provided which can be unlatched via an unlatching button 13. As FIG. 2 shows, a latching pin 60 is connected to the unlatching button 13, the latching pin being arranged on that side of the guide tube 4 which is opposite the unlatching button 13 and protruding into a latching opening 59 of the guide tube 4. The guide tube 4 has a plurality of latching openings 59 which are arranged at a distance from one another and define possible latching positions of the guide tube 4. For the unlatching, the unlatching button 13 is pressed by the operator and, as a result, is moved in an actuating direction 62 counter to the force of a spring 61. In the embodiment, the spring 61 is a leaf spring which acts on the latching pin 60 and pushes the latter into the locked position. During the unlatching, the latching pin 60 is disengaged from the guide tube 4, and therefore the guide tube 4 can be moved in the direction of the longitudinal center axis 14 into the desired position. For the latching, the unlatching button 13 is released, and the spring 61 pushes the latching pin 60 into a latching opening 59, as a result of which the guide tube 4 is fixed in its axial position and its angular position. Until the latching pin 60 enters a latching opening 59, a movement of the guide tube 4 in the direction of its longitudinal center axis 14 may be necessary. The latching pin 60 secures the guide tube 4 both in the direction of its longitudinal center axis 14 and also in the circumferential direction, and therefore a swivel movement of the guide tube 4 about its longitudinal center axis 14 in relation to the housing 5 is also prevented. Only when the length adjustment unit 12 is unlatched would swiveling of the guide tube 4 about its longitudinal center axis 14 be possible. However, swiveling of the guide tube 4 in relation to the housing 5 is prevented by the swivel protection 18 described below (FIG. 3).

Figure 3:
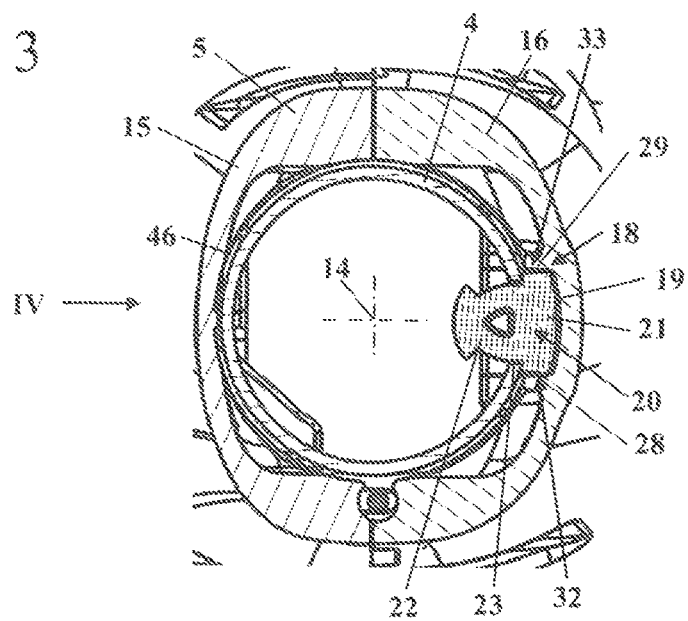
FIG. 3 shows a section along the line III-III in FIG. 1.

As FIG. 3 shows, the housing 5 in the embodiment is composed of two housing shells 15 and 16 which are connected to each other at connecting interfaces. The two housing shells 15 and 16 are preferably connected in a customary manner by fastening screws 17 shown by way of example in FIG. 1 which are screwed from the one housing shell into the other housing shell. A tubular configuration of the housing 5 may also be advantageous.

In order to define the orientation of the tool head 2 in relation to the housing 5 even when the length adjustment unit 12 is unlatched, the swivel protection 18, which is shown in FIG. 3, is provided for the guide tube 4. The swivel protection 18 comprises a guide part 20 which, in the embodiment, is held on the guide tube 4 and which protrudes into a groove 19 in the housing 5. The groove 19 extends parallel to the longitudinal center axis 14 of the guide tube 4. The groove 19 has mutually opposite longitudinal walls 28 and 29 which are each adjacent to one side of the guide part 20 in the circumferential direction with respect to the longitudinal center axis 14. The guide part 20 and the longitudinal wall 28 form the components of a rotation stop 32. The guide part and the longitudinal wall 29 form the components of a rotation stop 33 acting in the other direction of rotation. The longitudinal walls 28 and 29 can lie against the guide part 20. However, a small distance is preferably provided between the longitudinal walls 28 and 29 and the guide part 20, and therefore the guide part 20 can be pushed along the longitudinal walls 28 and 29 with little effort.

The circumferential direction, the axial direction and the radial direction always relate here to the longitudinal center axis 14 of the guide tube 4, unless expressly stated otherwise.

Figure 20:
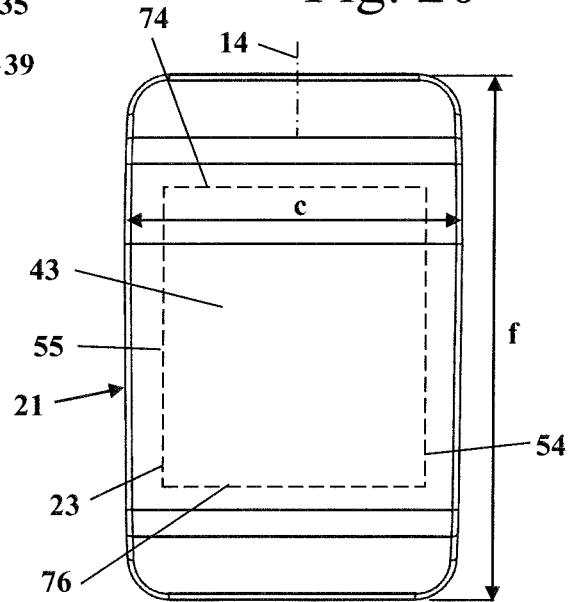

The guide part 20 has a head 21 which protrudes into the groove 19. In addition, the guide part 20 has a foot 22 which protrudes through a receptacle 23 in the guide tube 4 into the interior of the guide tube 4. The receptacle 23 is configured as an opening in the guide tube 4, the opening, in the embodiment, having a rectangular cross section, as FIG. 20 schematically shows. The longitudinal sides of the receptacle 23 run parallel here to the longitudinal center axis 14 of the guide tube 4.

Figure 4:
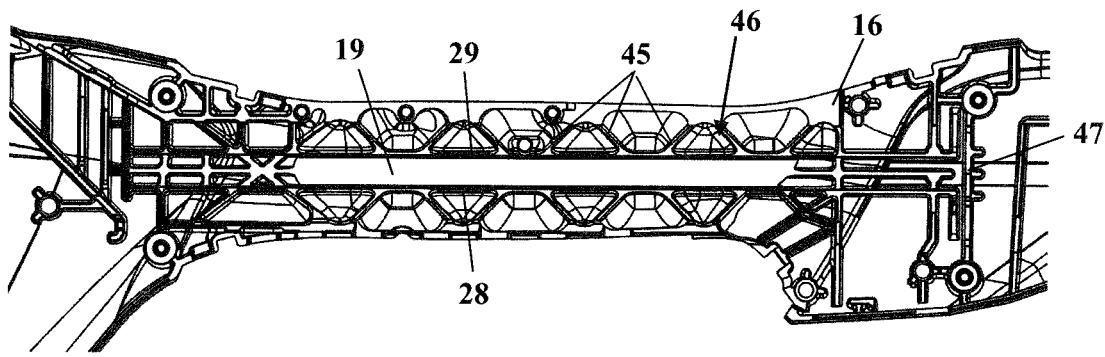
FIG. 4 shows a partial side view of a housing shell of the housing in the direction of the arrow IV in FIG. 3.

FIG. 4 shows the groove 19 in the housing shell 16. In the direction of the tool head 2 (FIG. 1), the groove 19 is bounded by a stop rib 47. In the position of the guide tube 4 extended maximally out of the housing 5, the guide part 20 lies against the stop rib 47 and thereby secures the end position of the guide tube 4. One part of a guide tube receptacle 46 for the guide tube 4 is formed in the housing shell 16. The other opposite part of the guide tube receptacle 46 is formed in the housing shell 15. As FIG. 3 also shows, the guide tube receptacle 46 has a cylindrical interior in which the guide tube 4 is guided. However, the walls of the guide tube receptacle 46 do not run continuously, as FIG. 4 shows, but rather are formed by individual ribs 45 which, in the embodiment, run obliquely with respect to the longitudinal center axis 14 (FIG. 3) and not radially in side view. The groove 19 can also be bounded by individual ribs. If pivoting of the tool head 2 is desired, for example into a position pivoted by 90° about the longitudinal center axis 14, guide channels running in the circumferential direction in the guide tube receptacle 46 can be formed for the guide part, the guide channels connecting together two grooves 19 formed at the desired angular distance from each other.

Figure 5:
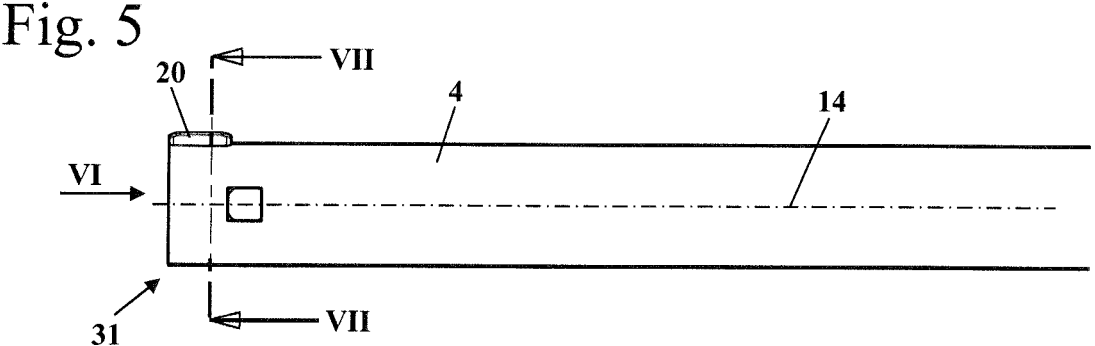
FIG. 5 shows a side view of the guide tube in the region of the second end of the guide tube.

As FIG. 5 shows, the guide part 20 is arranged directly adjacent to the second end 31 of the guide tube 4. In the embodiment, the guide part 20 ends flush with the guide tube 4.

Figure 6:
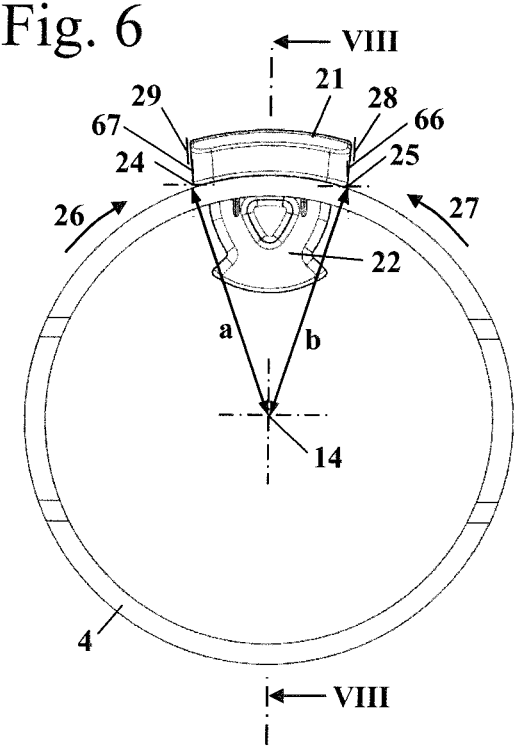
FIG. 6 shows a side view in the direction of the arrow VI in FIG. 5.
Figure 7:
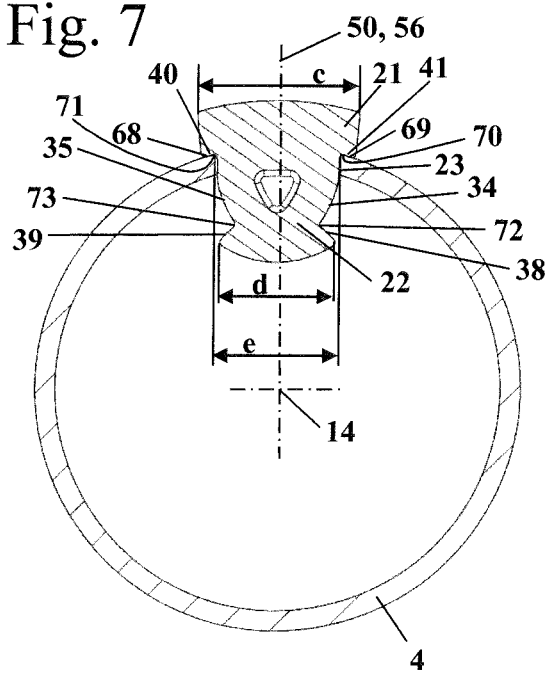
FIG. 7 shows a section along the line VII-VII in FIG. 5.

FIGS. 6 and 7 show the configuration of the guide part 20 in the guide tube 4 in detail. FIGS. 6 and 7 show the guide part 20 in a rest position. The rest position is the position in which the longitudinal walls 28 and 29 and the guide part 20 do not exert any force on each other. The longitudinal walls 28 and 29 are shown schematically in FIG. 6. In the rest position, the receptacle 23 runs adjacent to the region in which head 21 and foot 22 are connected to each other, and the foot 22 is completely arranged in the guide tube 4 and the head 21 completely outside the guide tube 4. The head 21 is located at a small distance on both sides between the longitudinal walls 28 and 29. The head 21 of the guide part 20 lies against the outer circumference of the guide tube 4. The foot 22 protrudes through the receptacle 23 (FIG. 7) into the interior of the guide tube 4.

The outer edges 68 and 69 of the head 21, the outer edges being shown in FIG. 7 and running parallel to the longitudinal center axis 14 of the guide tube 4 and being arranged on the outer circumference of the guide tube 4, form tilt axes 24 and 25 for the guide part 20. The first tilt axis 24 runs at a distance a from the longitudinal center axis 14 which, in the embodiment, corresponds to the radius of the guide tube 4. The second tilt axis 25 has a distance b from the longitudinal center axis 14, this distance, in the embodiment, being the same size as the distance a. If the guide tube 4 is swiveled in relation to the housing 5 in a first swivel direction 26, the guide part 20 tilts about the first tilt axis 24. If the guide tube 4 is swiveled in a second, oppositely directed second swivel direction 27 in relation to the housing 5, the guide part 20 tilts about the second tilt axis 25. During the tilting about the first tilt axis 24, the guide part is supported here with the head 21 on the first longitudinal wall 28 and with the outer edge 68, shown in FIG. 7, on the guide tube 4. The first tilt axis 24 runs on the outer edge 68. During swiveling of the guide tube 4 in relation to the housing 5 in the second swivel direction 27, the guide part 20 is supported, during the tilting about the second tilt axis 25, with the head 21 on the second longitudinal wall 29 and the second outer edge 69 which is shown in FIG. 7. The second outer edge 69 lies here against the outer side of the guide tube 4. The tilt axis 24, 25 and the associated longitudinal wall 28, 29 each lie here on different sides of a center line 56 of the guide part 20, the center line being oriented in the radial direction 50. In the illustration shown in FIG. 7, the center line 56 coincides with a center plane of the guide part 20, the center plane containing the longitudinal center axis 14 of the guide tube 4 and the center line 56.

Figure 14:
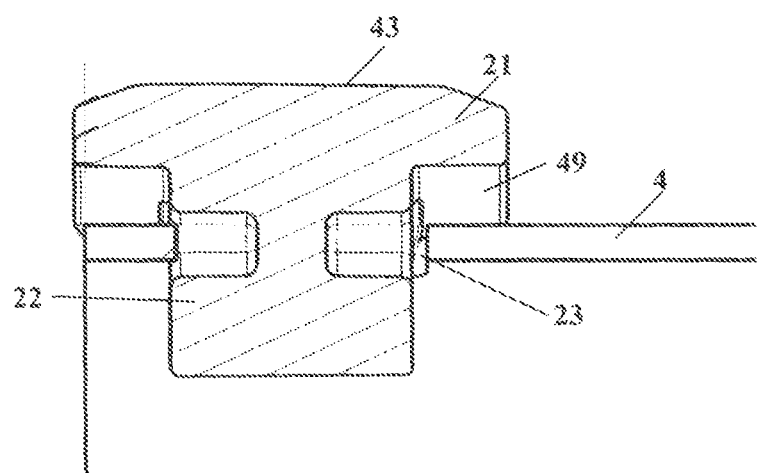
FIG. 14 shows a partial sectional view along the line XIV-XIV in FIG. 13.

As FIG. 7 shows, the guide part 20 has, on a bottom side 49, shown in FIG. 14, of its head 21, support sections 40 and 41 with which the guide part 20 lies against the outer circumference of the guide tube 4. In the rest position, the two support sections 40 and 41 lie against the outer circumference of the guide tube 4. The support sections 40 and 41 advantageously extend over the entire length of the head 21 in the direction of the longitudinal center axis 14. In the circumferential direction, the support sections 40, 41 each extend from an outer edge 68, 69 in the direction of the center line 56 as far as the region in which the head 21 is connected to the foot 22. The tilt axes 24 and 25 each run on the outer edges 68, 69 of the support sections 40, 41. The head 21 has flanks 66 and 67 which lie in the circumferential direction and with which the head 21 comes into contact with the longitudinal walls 28 and 29. The flanks 66 and 67 are advantageously of even and flat configuration and extend in the direction of the longitudinal center axis 14. The outer edges 68 and 69 run between the flanks 66 and 67 and the support sections 40 and 41. The outer edges 68 and 69 extend in the direction of the longitudinal center axis 14 of the guide tube 4. The outer edges 68 and 69 run parallel to the associated tilt axis 24, 25.

As FIG. 7 shows, the head 21 has a width c which is wider than a width e of the receptacle 23. The width c can be, for example, 1.1 times to 1.5 times the width e of the receptacle 23. The foot 22 has a width d which is slightly smaller than the width e of the receptacle 23. As a result, the foot 22 can be inserted through the receptacle 23 into the interior of the guide tube 4 or removed. Snapping or tipping of the guide part 20 in the receptacle 23 is not provided in the embodiment here. The widths c, d and e are measured perpendicular to the longitudinal center axis 14 and perpendicular to a radial direction 50 of the longitudinal center axis 14. The radial direction 50 is shown by a chain-dotted line in FIG. 7. The widths c, d and e are measured in the circumferential direction, with the curved profile of the circumference not being taken into consideration. The widths c, d and e are therefore measured tangentially to the circumferential direction. The width c is measured between the flanks 66 and 67.

The width c of the head 21 is advantageously larger on the bottom side 49 (FIG. 14) of the head 21 than the width e of the receptacle 23. The width c is advantageously increased radially outward, as is described in more detail below.

As FIG. 7 also shows, the foot 22 of the guide part 20 is formed by two sections, namely a first section which is bounded by guide sections 34 and 35, and a second section on which stop sections 38 and 39 are formed. The guide sections 34 and 35 adjoin the head 21. A respective shoulder 70, 71 at which the width of the guide part 20 is reduced from the head 21 to the foot 22 is formed between the guide sections 34 and 35 and the head 21. The guide sections 34 and 35 run in a curved manner, wherein the width of the foot 22 decreases radially inward in the region of the guide sections 34 and 35. In the region of the stop sections 38 and 39, the width of the foot 22 increases again radially inward. A respective necking 72, 73 is formed between the guide sections 34, 35 and the stop sections 38, 39. The guide part 20 has its minimal width at the neckings 72 and 73. The guide section 34 runs in a curved manner about the first tilt axis 24 in a side view (FIG. 6). The second guide section 35 runs in a curved manner about the second tilt axis 25 in a side view (FIG. 6). The guide sections 34 and 35 therefore form cylinder sections.

The stop sections 38 and 39 also run in a curved manner, namely in a convexly curved manner. The curvature of the stop sections 38 and 39 corresponds here to the curvature of the inner wall of the guide tube 4, as is described in more detail below.

Figure 8:
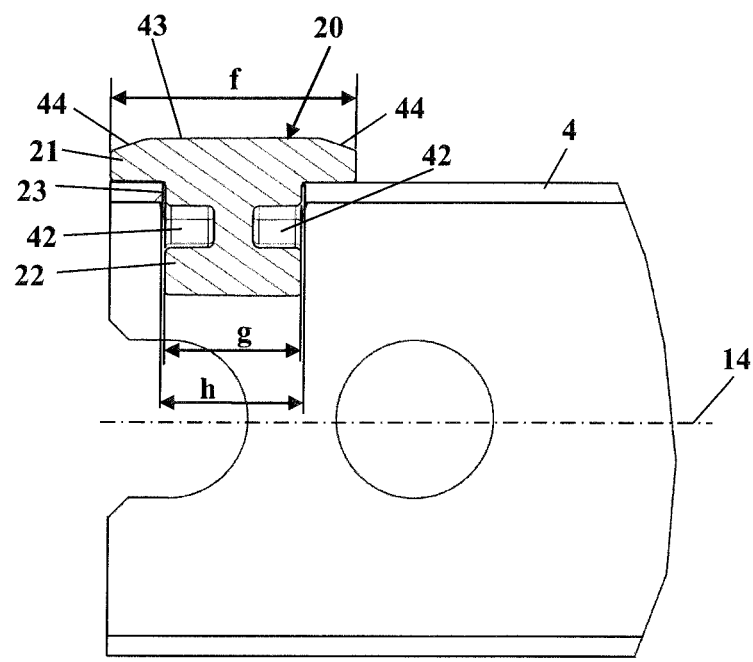
FIG. 8 shows a section along the line VIII-VIII in FIG. 6.
Figure 9:
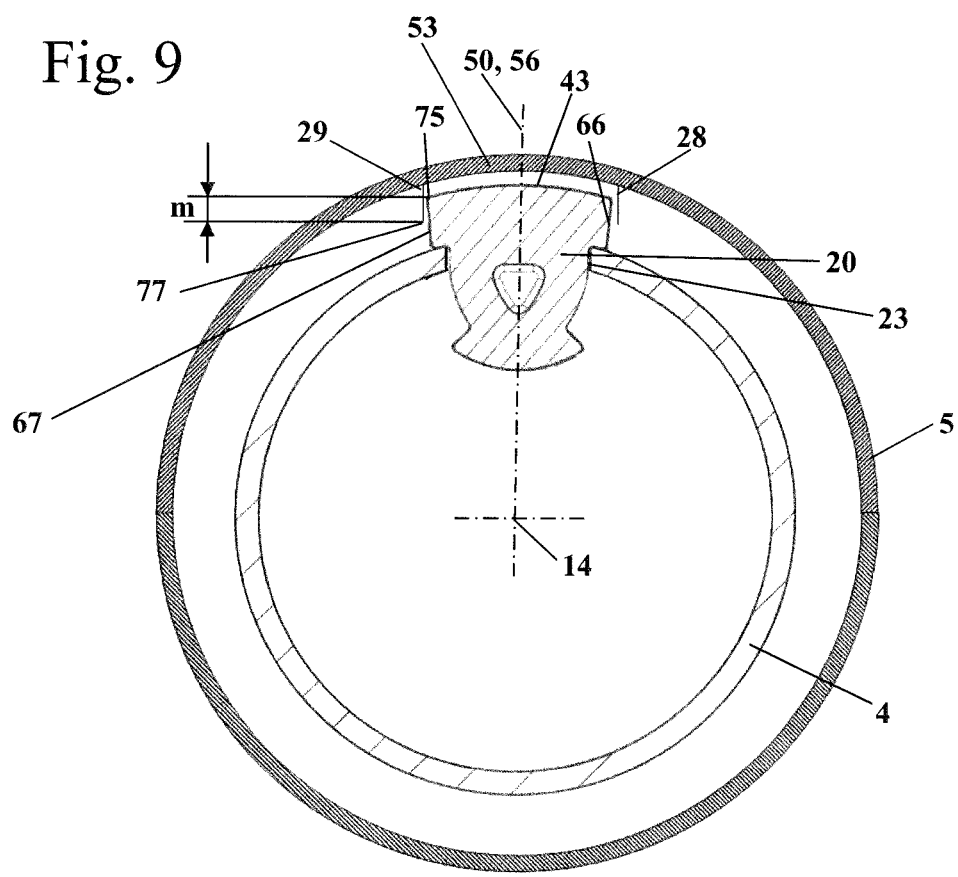
FIG. 9 shows a schematic sectional view through guide tube and housing in an undeformed state of the housing.

FIG. 8 shows the guide part 20 in the receptacle 23 in a longitudinal section through the guide tube 4. As FIG. 8 shows, the head 21 of the guide part 20 has a top side 43 which lies facing the groove base 53 of the groove 19 (FIG. 9). The top side 43 has chamfers 44 on the regions lying at the front and rear in the direction of the longitudinal center axis 14. The head 21 has a length f measured in the direction of the longitudinal center axis 14. As FIG. 8 shows, the length f of the head 21 is significantly larger than the length h of the receptacle 23, which length is measured in the same direction. The length f can be, for example, 1.5 times to 2.5 times the length h of the receptacle 23. The foot 22 has a length g which is slightly smaller than the length h. As a result, the guide part 20 can be plugged with a foot 22 through the receptacle 23 and lies loosely in the receptacle 23. As FIG. 8 also shows, on its front ends lying in the longitudinal direction, the foot 22 has recesses 42 in the region lying between the guide sections 34 and 35 (FIG. 7). Uniform wall thicknesses are achieved by the recesses 42, and therefore the guide part 20 can be produced in a simple manner in an injection molding process, preferably from plastic.

FIGS. 9 to 13 show the guide part 20 in the guide tube 4, wherein the housing 5 is illustrated schematically. FIG. 9 shows the guide part 20 in a rest position and the housing 5 schematically in an undeformed state. In the rest position, the guide part and the longitudinal wall 29 have an overlap m which is measured parallel to a center line 56 of the guide part 20. The center line 56 is oriented radially with respect to the longitudinal center axis 14 of the guide tube 4. In the embodiment, the center line 56 lies in the plane of symmetry of the guide part 20. The overlap is measured on the flank 67 between a top edge 75, at which the top side 43 is adjacent to the flank 67, and a front end 77 of the longitudinal wall 29. The front end 77 is the radially inner longitudinal edge of the longitudinal wall 29 lying remote from the groove base 53. On the opposite side, the flank 66 has a corresponding overlap (not shown in FIG. 9) with the longitudinal wall 28.

Figure 10:
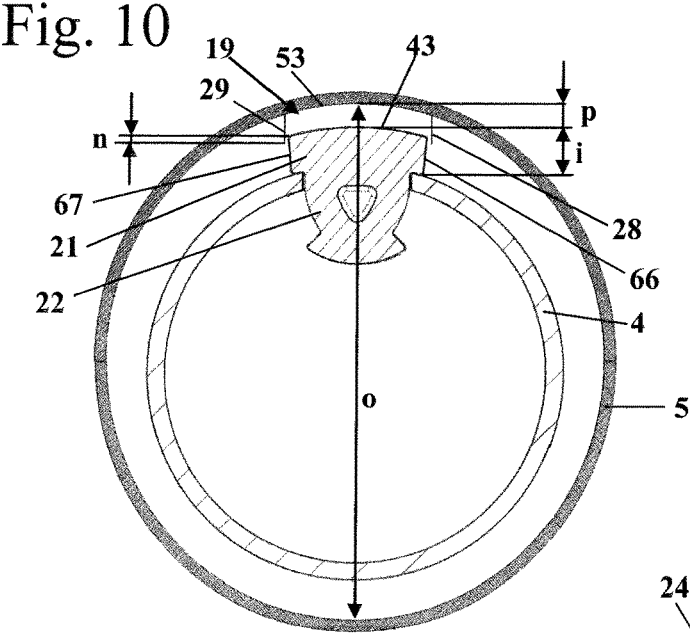
FIG. 10 shows a schematic sectional view through guide tube and housing in a deformed state of the housing.

FIG. 10 shows the arrangement after release of the length adjustment unit 12 or other loading of the housing 5. In particular upon release of the length adjustment unit 12, the housing 5 can be deformed. In addition, the guide tube 4 is deflected in the radial direction in relation to the housing 5.

FIG. 10 schematically shows the deformed configuration of the housing 5 which in this state has an increased inside diameter o. The head 21 has a height i which is measured perpendicular to the longitudinal center axis 14 (FIG. 11) and in the radial direction with respect to the longitudinal center axis 14. An increased distance p is formed between the top side 43 of the head 21 and a groove base 53 of the groove 19 because of the deformation. In an unloaded state, only a small distance is formed between the groove base 53 and the top side 43 of the head 21, or the top side 43 lies against the groove base 53, as FIG. 9 shows. The head 21 has an overlap n with respect to the longitudinal wall 29 that is significantly smaller than the overlap m in the rest position (FIG. 9).

Figure 11:
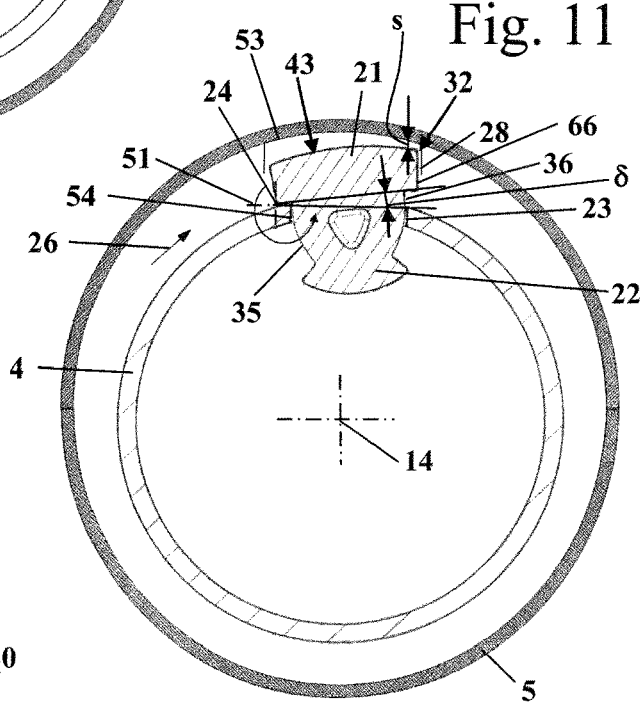
FIG. 11 shows a schematic of guide tube, housing and guide part during a swiveling movement of the guide tube in relation to the housing in a first swivel direction.

If, when the length adjustment unit 12 is released (FIG. 2), the guide tube 4 is swiveled in the first swivel direction 26, the guide part 20 thereby tilts, as FIG. 11 shows. In FIG. 11, the guide part 20 is swiveled in relation to the rest position about a tilt angle 6 which is at least 1°, in particular at least 5°, preferably at least 10°. The tilt angle 6 corresponds to the maximum tilt angle of the guide part 20 at which the guide part 20 does not yet press with its head 21 against the housing 5 and deform the housing 5. The head 21 of the guide part 20 lies with its flank 66 against the longitudinal wall 28. The longitudinal wall 28 presses against the head 21, and the foot 22 of the guide part 20 is supported with its guide section 35 on that longitudinal edge 54 of the receptacle 23 which lies opposite the longitudinal wall 28. As a result, a tilt moment is exerted on the guide part 20, which causes pivoting in a first tilt direction 51. The tilting movement takes place here about the first tilt axis 24.

Figure 12:
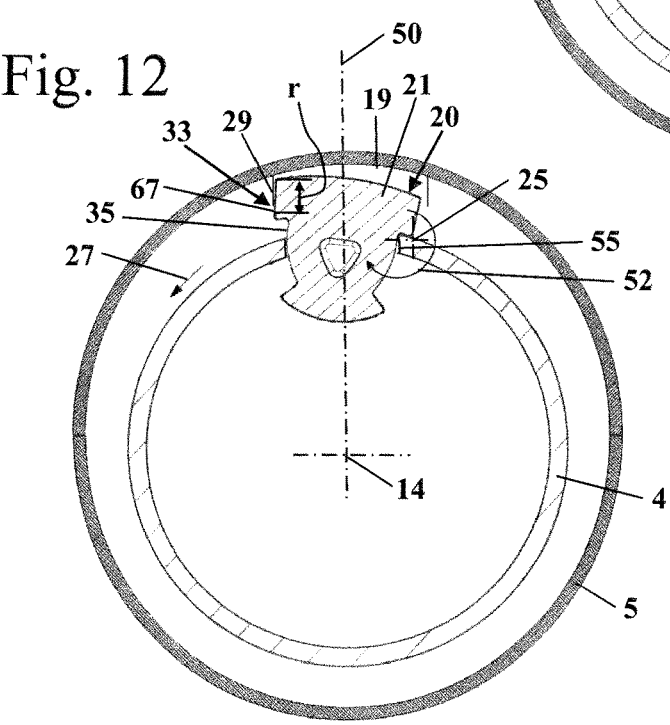
FIG. 12 shows the schematic from FIG. 11 during a swiveling movement of the guide tube in an oppositely directed second swivel direction.

If the guide tube 4 is pivoted in the oppositely directed second pivot direction 27 in relation to the housing 5, the guide part 20 tilts about the second tilt axis 25, as FIG. 12 shows. The guide part 20 is supported here with its flank 67 on the second longitudinal wall 29 of the housing 5 and on a second longitudinal edge 55 of the receptacle 23, which longitudinal edge lies remote from the longitudinal wall 29. By means of the offset of the longitudinal wall 29 and of the longitudinal edge 55 in the radial direction 50 with respect to the longitudinal center axis 14, a tilt moment is exerted on the guide part 20, the tilt moment leading to tilting in the second tilt direction 52 about the second tilt axis 25, as illustrated schematically in FIG. 12. As FIGS. 11 and 12 show, during the tilting, the height, measured radially with respect to the longitudinal center axis 14, of that section of the guide part 20 which protrudes out of the guide tube 4 is increased. As a result, in the embodiment, the increased distance p formed between the guide tube 4 and the housing 5 (FIG. 10) is bridged after the guide tube 4 is slightly pivoted in relation to the housing 5, as FIGS. 11 and 12 show. The guide part 20 has an overlap r with respect to the longitudinal wall 29, which overlap is increased in relation to the overlap n in the deformed state of the housing 5 and in relation to the overlap m in the rest position. A corresponding increased overlap arises when the guide part 20 is tilted about the tilt axis 24, as FIG. 11 shows. As a result, the longitudinal walls 28 and 29 cannot be pushed over the head 21 of the guide part 20. After the tilting, there is only a narrow gap between the groove base 53 and the top side 43 of the head 21, or the top side 43 lies against the groove base 53. Between the top side 43 and the groove base 53 there is a distance s which is shown in FIG. 11 for the sake of better clarity. The distance s is significantly smaller than the distance p which arises when the housing is deformed and in the rest position of the guide part 20. As a result, the bending moment exerted on the longitudinal wall 28 or 29 with respect to the groove base 53 is comparatively small.

Figure 13:
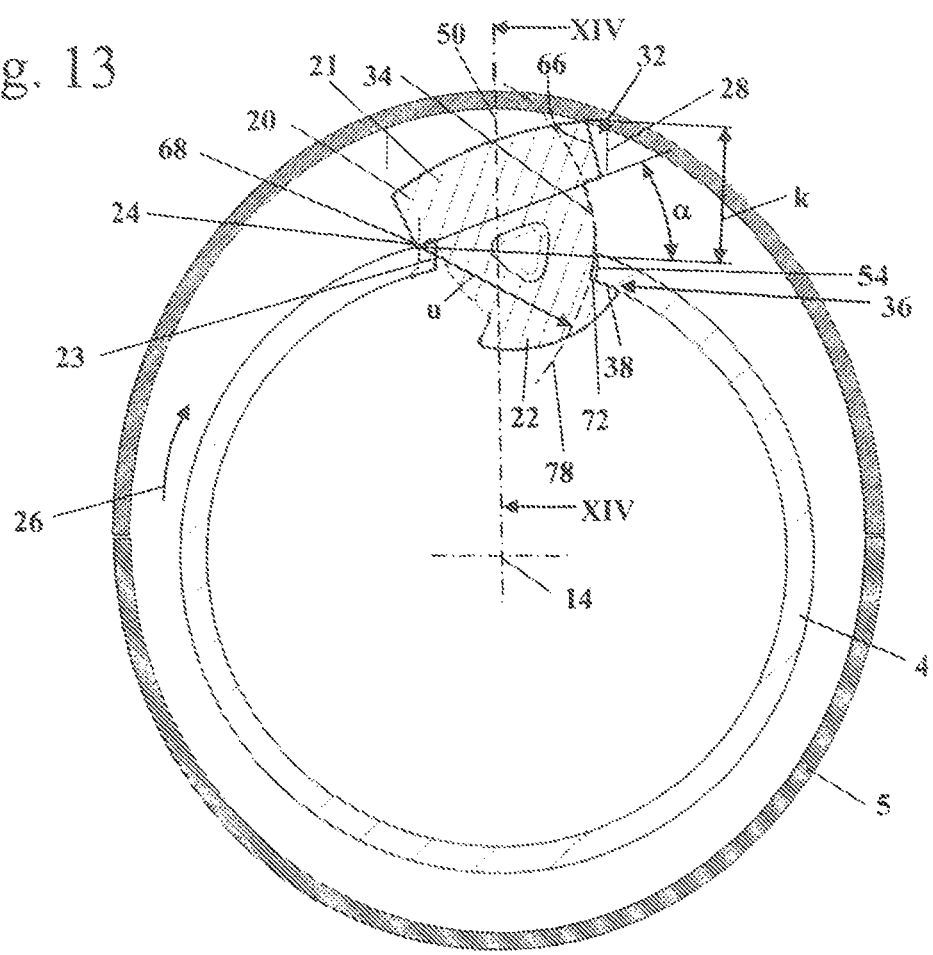
FIG. 13 shows a schematic sectional view of guide tube, guide part and housing in a first end position.

During the swiveling of the guide tube 4 in relation to the housing 5, the housing 5 is further deformed because of the tilting movement of the guide part 20. In order to avoid damage to the housing 5 by excessive tilting of the guide part 20, stops for limiting the maximum tilt angle are provided. FIG. 13 shows the guide part 20 in a first end position into which the guide part 20 has passed by tilting about the first tilt axis 24. In comparison to its rest position shown in FIG. 7, the guide part 20 is tilted about a tilt angle a which is more than 10°, in particular more than 15°. In the embodiment, a tilt angle a of more than 20° is provided. In the end position shown in FIG. 13, the foot 22 lies with its first stop section 38 against the inner side of the guide tube 4 and forms a stop 36 therewith. The convex curvature of the stop section 38 is configured in such a manner that the stop section 38 lies flat against the inner side of the guide tube 4. The first necking 72 lies adjacent to the longitudinal edge 54 of the receptacle 23 on the inner side of the guide tube 4. The guide part 20 hooks with the necking 72 approximately onto the receptacle 23. That section of the guide part 20 which protrudes out of the guide tube 4 has a height k which is significantly larger than the height i of the head 21. In the embodiment, the height k is 1.5 times to 2.5 times the height i in the end position of the guide part 20 (FIG. 10). The height k is measured here in the radial direction 50 of the longitudinal center axis 14. The first guide section 34 is arranged partially in the receptacle 23 and partially outside the guide tube 4. Further swiveling of the guide tube 4 out of the position shown in FIG. 13 in the first swivel direction 26 is prevented by the guide part 20.

The tilt angle δ about which the guide part 20 is tiltable is advantageously at least 1°, in particular at least 5°, preferably at least 10°. A sufficiently large overlap r can thereby be ensured in the tilted state of the guide part 20.

As FIG. 13 shows, the longitudinal wall 28 and the flank 66 of the guide part 20 form the first rotation stop 32 which restricts the swiveling of the guide tube 4 in the first swivel direction 26. FIG. 13 shows the longitudinal wall 28 at a small distance from the head 21 for the sake of better clarity. In the actual configuration, the head 21 lies against the longitudinal wall 28 and is supported on the latter. The head 21 lies here against the longitudinal wall 28 at a distance from the guide tube 4. The flank 66 lies against the longitudinal wall 28 with the region adjacent to the top side 43 of the head 21. The longitudinal wall 28 forms a counterbearing for the guide part 20. The opposite outer edge 68 of the guide part 20 together with the outer wall of the guide tube 4 forms the associated support on which the guide part 20 is supported. The longitudinal edge 54 of the receptacle 23 lies adjacent to the first guide section 34. During the tilting out of the rest position shown in FIG. 10 via the tilt position shown in FIG. 11 into the end position shown in FIG. 13, the first guide section 34 swivels at a small distance along the longitudinal edge 54. Owing to the cylinder section 78 which is formed by the guide section 34 and is shown in FIG. 13 with a dashed line, the distance between longitudinal edge 54 and guide section 34 remains constant during the tilting. The radius u of the cylinder section 78 corresponds here to the distance of the tilt axis 24 from the associated guide section 34.

As FIG. 14 shows, the head 21 has a bottom side 49 which faces the guide tube 4 and with which the head lies against the outer side of the guide tube 4 in the rest position. In the tilted position shown in FIG. 13, the bottom side 49 is raised from the guide tube 4. Only in the region of the first tilt axis 24 does the bottom side 49 have contact with the outer side of the guide tube 4, as FIG. 13 shows.

Figure 15:
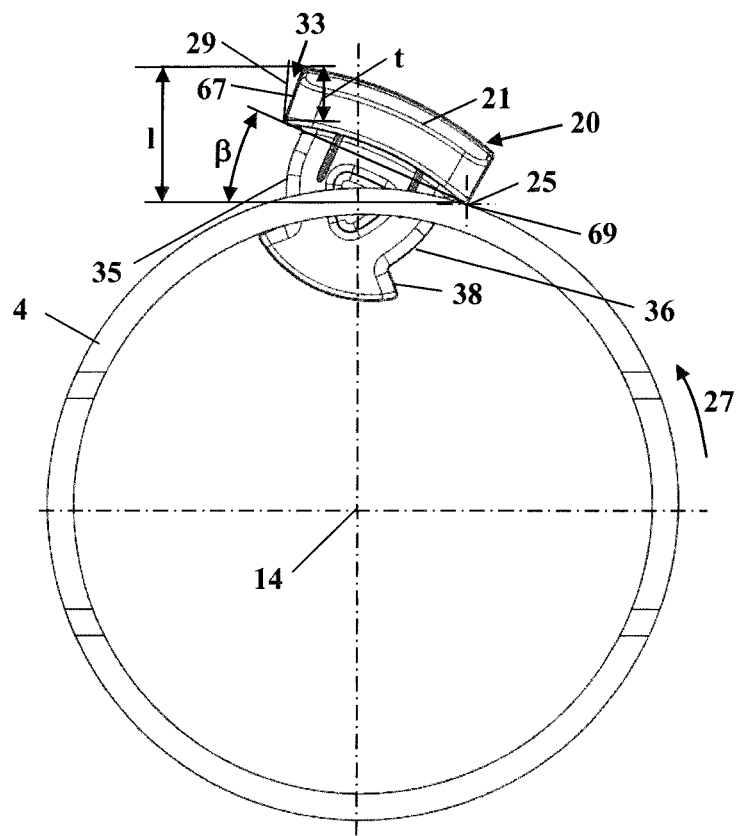
FIG. 15 shows a side view of the guide tube in a second end position of the guide tube, wherein only one longitudinal wall of the housing is schematically shown.
Figure 16:
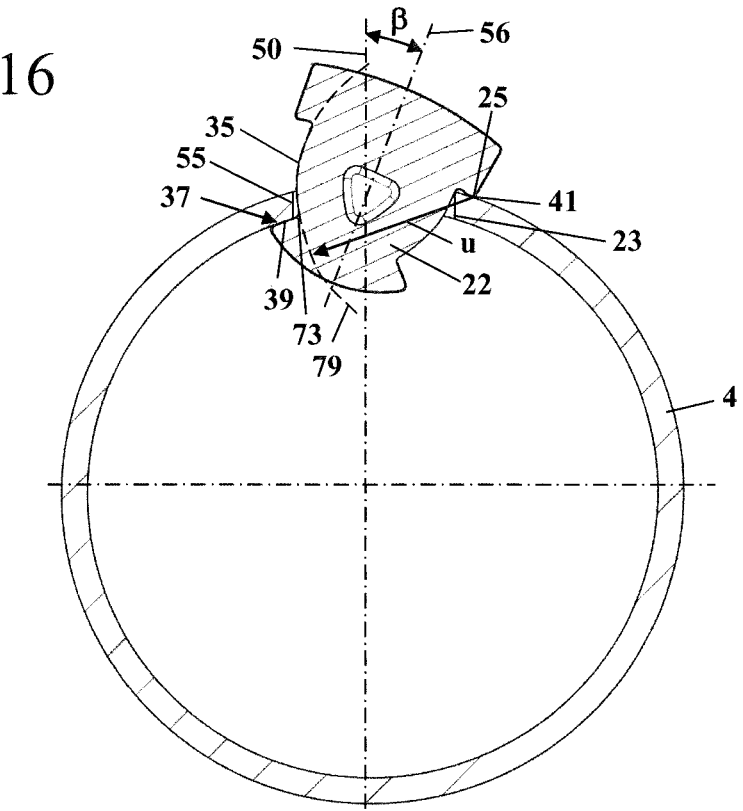
FIG. 16 shows a section through the guide part and the guide tube in the position from FIG. 15.
Figure 17:
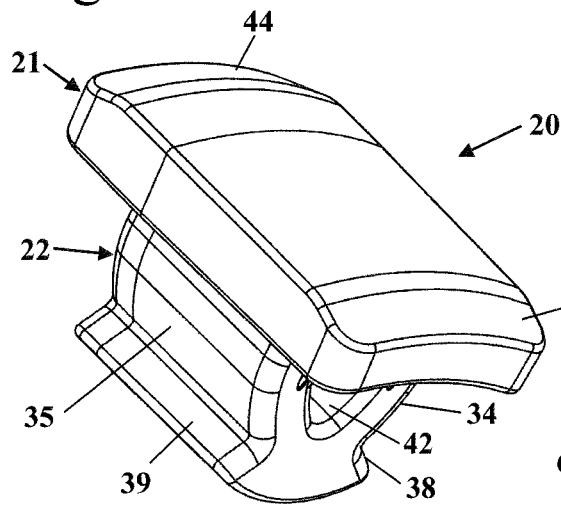
FIG. 17 shows a perspective view of the guide part.

FIGS. 15 and 16 show the guide part 20 in the position maximally tilted about the second tilt axis 25. The guide part 20 is tilted about a tilt angle β in relation to the rest position. During the tilting of the guide part from the rest position into the end position shown in FIG. 16, the guide section 35 moves at a small distance along the longitudinal edge 55 of the receptacle 23. The guide section 35 has the shape of a cylinder section 79, which is shown with dashed lines in FIG. 16, with a radius u about the tilt axis 25. The radius u corresponds here to the distance of the tilt axis 25 from the guide section 35. In the embodiment, the guide part 20 is of symmetrical configuration, and the tilt angles α and β are the same size. However, an asymmetrical configuration of the guide part 20 may also be advantageous, wherein different tilt angles α and β may also be advantageous. That section of the guide part 20 which protrudes out of the guide tube 4 has a height 1 which is significantly greater than the height i of the head 21 in the rest position (FIG. 10). This results in an overlap t between the flank 67 and the longitudinal wall 29, the overlap being significantly greater than the overlap m in the rest position (FIG. 9) and the overlap n in the deformed state of the housing 5 (FIG. 10). The overlap t is advantageously also greater than the overlap r at a smaller tilt angle (FIG. 12). As FIG. 16 shows, the tilt angle β also arises between a center line 56 of the guide part 20 and the radial direction 50. In the embodiment, the center line 56 is oriented in the radial direction 50 in the rest position. During the tilting about the second tilt axis 25 (FIG. 15), the guide part 20 lies with the second support section 41 against the outer side of the guide tube 4. A second stop 37 is formed between the guide tube 4 and the foot 22. The second stop 37 is formed by the second stop section 39 which lies flat against the inner wall of the guide tube 4. In the end position of the guide part 20 that is shown in FIG. 16, the second necking 73 is arranged on the inner side of the guide tube 4 adjacent to the longitudinal edge 55 of the receptacle 23. In this end position, the guide part 20 hooks with the necking 73 onto the receptacle 23.

During swiveling of the guide tube 4 in relation to the housing 5 in the second swivel direction 27, the longitudinal wall 29 together with the flank 67 of the guide part 20 forms the second rotation stop 33 which limits the relative swiveling of the guide tube 4 in relation to the housing 5 in the second swivel direction 27.

FIGS. 17 to 20 show the guide part 20 in detail. As the figures show, the head 21 is configured in the manner of a roof which advantageously protrudes on all sides over the foot 22. The head 21 preferably protrudes over the foot 22 at least in one direction out of the circumferential direction and direction of the longitudinal center axis 14 of the guide tube 4. The head 21 particularly advantageously protrudes over the foot 22 at least in the circumferential direction. FIG. 20 schematically shows the receptacle 23 with its longitudinal edges 54 and 55. The head 21 advantageously protrudes over the receptacle 23 in at least one direction, in particular in the circumferential direction. The head 21 preferably protrudes over the receptacle 23 both in the circumferential direction at the longitudinal edges 54 and 55 and also in the direction of the longitudinal center axis 14 of the guide tube 4.

Figure 18:
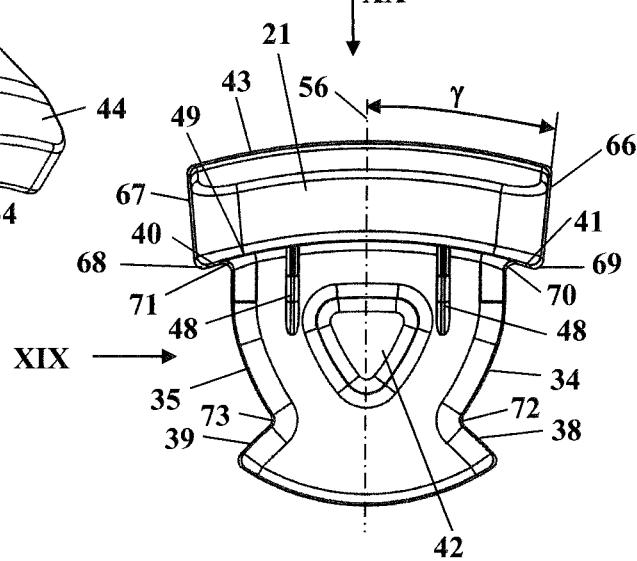
FIG. 18 shows a side view of the guide part.

As FIG. 18 shows, both the top side 43 and the bottom side 49 of the head 21 have a curved profile. The curvature of the bottom side 49 follows the curvature of the outer circumference of the guide tube 4, and the curvature of the top side 43 follows a curvature of the groove base 53 of the groove 19 (FIG. 10). The support sections 40 and 41 are formed by the regions protruding over the foot 22 in the circumferential direction and, if the head 21 protrudes over the foot 22 in the direction of the longitudinal center axis 14 of the guide tube 4, by the extension of the head in the direction of the longitudinal center axis 14. At the outer edges 68 and 69, the support sections 40, 41 protrude into the flanks 66, 67. In the embodiment, the outer edges 68 and 69 are of rounded configuration, and therefore, during the tilting, the guide part 20 can roll slightly on the outer side of the guide tube 4. As FIG. 18 also shows, the flanks 66 and 67 are inclined in relation to the center line 56 of the guide part 20. The flanks 66 and 67 each enclose with the center line 56 an angle γ which is shown in FIG. 18 for the flank 66. The angle γ is advantageously at least 5°. An angle y of 5° to 20°, in particular of 7° to 15°, is considered to be particularly advantageous. The flanks 66 and 67 are of flat and even configuration. The inclination of the flanks 66 and 67 is selected in such a manner that, at the tilt angles customary during operation, the flanks 66 and 67 come into contact with the region arranged adjacent to the top side 43 of the head 21 on the longitudinal walls 28 and 29, this resulting in low mechanical loading of the longitudinal walls 28, 29 and a good introduction of force into the housing 5. In the tilted state of the guide part 20, flat contact of the flanks 66 and 67 against the associated longitudinal walls 28, 29 advantageously arises.

Figure 19:
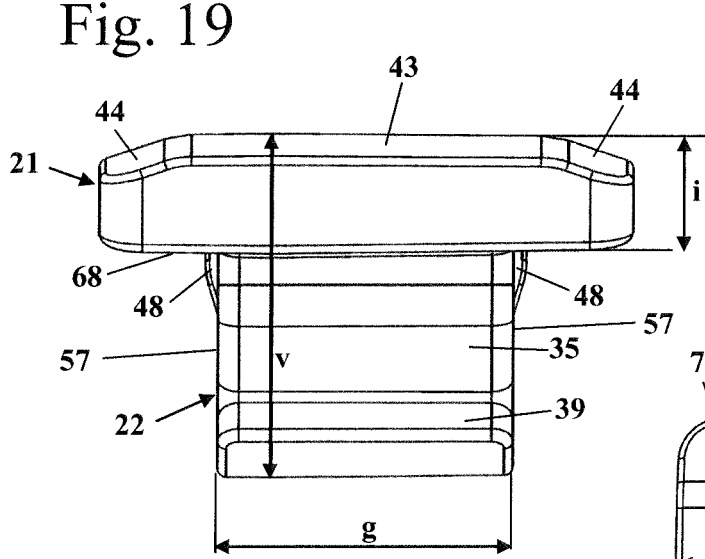
FIG. 19 shows a side view in the direction of the arrow XIX in FIG. 18; and, FIG. 20 shows a top view in the direction of the arrow XX in FIG. 18.

The outer edges 68 and 69 are advantageously configured to be as long as possible. As FIG. 19 shows, the outer edge 68 extends over a large part of the length f (FIG. 20) of the head 21 of the guide part 20. The outer edges 68, 69 can be of interrupted configuration here. The guide part 20 advantageously has two, in particular at least three, cross sections perpendicular to the longitudinal center axis 14, in which the guide sections 34, 35 and the flanks 66, 67 and the outer edges 68, 69 are of identical configuration. The cross sections determine the position of the guide part 20 in the tilted position. Between the cross sections, the flanks 66, 67, the guide sections 34, 35 and/or the outer edges 68, 69 can be interrupted or set back.

The height i is the overall height of the head 21, as FIG. 19 shows, and, in a side view of the head 21, is measured between the outer region of the support sections 40, 41 and the central region of the top side 43.

As FIGS. 18 and 19 show, the front ends of the foot 22 have holding ribs 48. The holding ribs 48 are of narrow configuration and extend to such an extent over the front ends 57, which lie transversely with respect to the longitudinal center axis 14, of the foot 22 that, during the installation of the guide part 20 in the receptacle 23, the foot 22 is initially held fixedly in the receptacle 23. As a result, the guide part 20 cannot unintentionally fall out of the receptacle 23 during the production of the lawn trimmer 1. During operation, the guide part 20 can move in the receptacle 23 in the described manner by an action of force. In the process, the holding ribs 48 are deformed or sheared off, and therefore, during customary operation, the guide part 20 lies loosely in the receptacle 23 and is secured against falling out by the groove base 53 of the groove 19 (FIG. 10). The shoulders 70 and 71 and the neckings 72 and 73 are also shown in FIG. 18.

As FIG. 20 schematically shows, the receptacle 23 has a rectangular cross section. The longitudinal edges 54 and 55 run parallel to the longitudinal center axis 14 which is likewise shown schematically in FIG. 20. The longitudinal edges 54 and 55 of the receptacle 23 run parallel to the outer edges 68 and 69 of the head 21, which outer edges are shown in FIG. 18. The transverse edges 74 and 76 of the receptacle 23, the transverse edges running between the longitudinal edges 54 and 55, can have any desired configuration, wherein at least one small gap in the direction of the longitudinal center axis 14 is formed between the transverse edges 75, 76 and the guide part 20. The head 21 of the guide part 20 can advantageously have a length f of approximately 8 mm to 20 mm, in particular of 10 mm to 15 mm, and a width c of 5 mm to 15 mm, in particular of 5 mm to 10 mm. The width d of the foot 22 is advantageously 3 mm to 10 mm, in particular 4 mm to 8 mm, and the length g of the foot 22 is advantageously 3 mm to 12 mm, in particular 5 mm to 10 mm. The height v of the guide part 20 that is shown in FIG. 19 and is measured in the radial direction is advantageously 5 mm to 15 mm, in particular 5 mm to 10 mm. The height v of the guide part 20 and the width c of the head 21 are advantageously approximately the same size. The height i of the head 21 is advantageously less than half of the height v of the guide part 20. The height i of the head 21 can advantageously be 1 mm to 5 mm, in particular 2 mm to 4 mm.

The guide part 20 shown forms a rotation stop in both swivel directions. However, the shown principle of the tilting of a guide part can also be provided in an arrangement of guide tube and housing, in which the swivel direction should be restricted only in one direction. The guide part should then be configured in such a manner that it produces an increase in the height of that section of the guide part which protrudes out of the guide tube 4 only in one swivel direction. The described arrangement of guide tube and housing may also be advantageous for other intended uses.

It is understood that the foregoing description is that of the preferred embodiments of the invention and that various changes and modifications may be made thereto without departing from the spirit and scope of the invention as defined in the appended claims.

What is claimed is:

1. A housing and guide tube arrangement comprising:
a housing;
a guide tube having a longitudinal center axis defining a direction;
said guide tube having a first end and being held in said housing at said first end;
said guide tube having a position relative to said housing adjustable in the direction of said longitudinal center axis;
a rotation stop to stop a swiveling of said guide tube relative to said housing about said longitudinal center axis;
said rotation stop including a longitudinal wall formed in said housing to run in the direction of said longitudinal center axis and a guide part mounted in said guide tube to coact with said longitudinal wall in response to said swiveling of said guide tube relative to said housing about said longitudinal center axis;
said guide part being movable with said guide tube along said longitudinal wall as the position of said guide tube is adjusted relative to said housing in said direction of said longitudinal center axis;
said guide part being tiltable with respect to said guide tube about a tilt axis;
said tilt axis running along said guide tube and spaced at a distance (a, b) from said longitudinal center axis; and,
said guide part and said longitudinal wall being configured to coact in response to said swiveling of said guide tube about said longitudinal center axis so as to cause said longitudinal wall to impart a tilt movement to said guide part about said tilt axis.

2. The arrangement of claim 1, wherein said guide part is tiltable about said tilt axis through a tilt angle ($\alpha$, $\beta$) from a rest position to a tilt position; and, said angle ($\alpha$, $\beta$) is at least 1°.

3. The arrangement of claim 1, wherein said tilt axis lies outside of said guide tube.

4. The arrangement of claim 1, further comprising:
said guide tube having a receptacle formed therein accommodating said guide part therein;
said guide part including a foot and a head;
said foot of said guide part being mounted at least partially in said receptacle so as to cause said head to project out of said receptacle and coact with said longitudinal wall.

5. The arrangement of claim 4, wherein said guide part has loaded and unloaded states; said guide part, in said unloaded state, defines a center line extending radially to said longitudinal center axis, and said longitudinal center axis and center line conjointly define a plane; said head of said guide part, in the unloaded state, has a width (c) measured perpendicular to said plane; and, said head of said guide part, in the unloaded state, has a height (i) measured along said center line with said width (c) being greater than said height (i).

6. The arrangement of claim 5, wherein said receptacle has a width (e) measured in the same direction as said width (c) of said head; and, said width (c) of said head is greater than said width (e) of said receptacle.

7. The arrangement of claim 6, wherein said foot of said guide part has a width (d) measured perpendicular to said plane and has a length (g) measured in the direction of said longitudinal center axis; and, at least one of the dimensions of said width (d) of said foot and said length (g) of said foot is less than the respective dimension of said receptacle measured in the same respective direction as said width (d) of said foot and length (g) of said foot.

8. The arrangement of claim 4, wherein said foot has at least one guide section configured to move out of said receptacle in response to said tilt movement of said guide part about said tilt axis causing said at least one guide section to extend in a manner of a cylindrical section about said tilt axis.

9. The arrangement of claim 8, wherein said receptacle has a longitudinal edge; and, said at least one guide section moves along said longitudinal edge of said receptacle during said tilt movement.

10. The arrangement of claim 4, wherein said receptacle has a rectangular cross section.

11. The arrangement of claim 4, wherein said receptacle is formed in said guide tube; and, said guide part is held at a fixed location on said guide tube in said direction of said longitudinal center axis.

12. The arrangement of claim 4, wherein said receptacle has a longitudinal edge; and, said head has a planar flat flank coacting with said longitudinal edge in response to said swiveling of said guide tube about said longitudinal center axis thereof.

13. A handheld work apparatus comprising:
a housing;
a guide tube having a longitudinal center axis defining a direction;
said guide tube having a first end and being held in said housing at said first end;

said guide tube having a position relative to said housing adjustable in the direction of said longitudinal center axis;

a rotation stop to stop a swiveling of said guide tube relative to said housing about said longitudinal center axis;

said rotation stop including a longitudinal wall formed in said housing to run in the direction of said longitudinal center axis and a guide part mounted in said guide tube to coact with said longitudinal wall in response to said swiveling of said guide tube relative to said housing about said longitudinal center axis;

said guide part being movable with said guide tube along said longitudinal wall as the position of said guide tube is adjusted relative to said housing in said direction of said longitudinal center axis;

said guide part being tiltable with respect to said guide tube about a tilt axis;

said tilt axis running along said guide tube and spaced at a distance (a, b) from said longitudinal center axis;

said guide part and said longitudinal wall being configured to coact in response to said swiveling of said guide tube about said longitudinal center axis so as to cause said longitudinal wall to impart a tilt movement to said guide part about said tilt axis;

said guide tube having a second end facing away from said first end; and, a tool head mounted on said second end of said guide tube.

14. A housing and guide tube arrangement comprising:

a housing;

a guide tube having a longitudinal center axis defining a direction;

said guide tube having a first end and being held in said housing at said first end;

said guide tube having a position relative to said housing adjustable in the direction of said longitudinal center axis;

a rotation stop to stop a swiveling of said guide tube relative to said housing about said longitudinal center axis;

said guide tube and said housing defining first and second components, respectively;

said rotation stop including a longitudinal wall formed in one of said components to run in the direction of said longitudinal center axis and a guide part mounted in the other one of said components to coact with said longitudinal wall in response to said swiveling of said guide tube relative to said housing about said longitudinal center axis;

the one of said components having a groove formed therein parallel to said longitudinal center axis;

said groove defining said longitudinal wall running in the direction of said longitudinal center axis;

said guide part having a head projecting into said groove;

said guide part being tiltable with respect to said other one of said components about a tilt axis; and, said tilt axis running along said other one of said components and spaced at a distance (a, b) from said longitudinal center axis.

* * * * *

UNITED STATES PATENT AND TRADEMARK OFFICE
CERTIFICATE OF CORRECTION

PATENT NO. : 11,192,233 B2  
APPLICATION NO. : 15/659470  
DATED : December 7, 2021  
INVENTOR(S) : D. Foerstner et al.

Page 1 of 1

It is certified that error appears in the above-identified patent and that said Letters Patent is hereby corrected as shown below:

In the Specification

In Column 11:  
Line 20: delete "6" and substitute -- δ -- therefor.  
Line 21: delete "6" and substitute -- δ -- therefor.

In Column 12:  
Line 12: delete "a" and substitute -- α -- therefor.  
Line 13: delete "angle a" and substitute -- angle α -- therefor.

In Column 14:  
Line 15: delete "y" and substitute -- γ -- therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*